(12) United States Patent
Cheney et al.

(10) Patent No.: US 10,154,094 B2
(45) Date of Patent: Dec. 11, 2018

(54) ELECTRONIC GLOVEBOX FOR A VEHICLE

(71) Applicant: General Motors LLC, Detroit, MI (US)

(72) Inventors: David S. Cheney, Wixom, MI (US); Steven P. Schwinke, Plymouth, MI (US); Hassan A. Elnajjar, Dearborn, MI (US)

(73) Assignee: GENERAL MOTORS LLC, Detroit, MI (US)

( * ) Notice: Subject to any disclaimer, the term of this patent is extended or adjusted under 35 U.S.C. 154(b) by 494 days.

(21) Appl. No.: 13/826,003

(22) Filed: Mar. 14, 2013

(65) Prior Publication Data

US 2014/0279019 A1 Sep. 18, 2014

(51) Int. Cl.
*H04L 29/08* (2006.01)

(52) U.S. Cl.
CPC .............. *H04L 67/12* (2013.01); *H04L 67/06* (2013.01)

(58) Field of Classification Search
USPC ...................................... 340/425.5; 709/219
See application file for complete search history.

(56) References Cited

U.S. PATENT DOCUMENTS

| | | | |
|---|---|---|---|
| 7,069,121 B1* | 6/2006 | Cummings et al. | 701/3 |
| 2003/0046158 A1* | 3/2003 | Kratky | G06Q 30/02 705/14.58 |
| 2004/0002359 A1* | 1/2004 | Deas | G06Q 30/02 455/556.2 |
| 2005/0240343 A1* | 10/2005 | Schmidt, II | G07C 5/008 701/414 |
| 2007/0038510 A1* | 2/2007 | Laghrari | G06Q 30/02 705/14.62 |
| 2010/0036600 A1* | 2/2010 | Shinmyoh | G01C 21/265 701/532 |
| 2010/0094996 A1* | 4/2010 | Samaha | G06Q 10/10 709/224 |
| 2011/0196571 A1* | 8/2011 | Foladare | G01S 5/0027 701/31.4 |
| 2013/0167039 A1* | 6/2013 | Howell | G06F 17/30867 715/748 |
| 2013/0211910 A1* | 8/2013 | Yerli | G06Q 30/0251 705/14.53 |
| 2014/0164579 A1* | 6/2014 | Douthitt | G07C 5/008 709/219 |

OTHER PUBLICATIONS

Zaidi, Kamran, et al, DIVA—Digital Identity in VANETs: A Multi-Authority Framework for VANETs, 2013, IEEE, p. 3-4 (Year: 2013).*

* cited by examiner

*Primary Examiner* — Marie P Brady
(74) *Attorney, Agent, or Firm* — David Willoughby; Reising Ethington P.C.

(57) ABSTRACT

A method and a system for providing access to a cloud computer from a vehicle. The method carried out by the system includes providing at least one client (e.g., an e-glovebox device). The method also includes configuring a cloud server to allow access to one or more clients and accessing the cloud server using the e-glovebox. The access may include uploading one or more data members to the cloud server. The access may also include downloading one or more data members from the cloud server.

13 Claims, 4 Drawing Sheets

ELECTRONIC GLOVEBOX FOR A VEHICLE

TECHNICAL FIELD

The present invention relates to cloud computing from a vehicle, and more specifically to accessing a cloud server database that, if desirable, is configurable to allow clients other than the vehicle access thereto.

BACKGROUND

Vehicle occupants are increasingly desiring greater access to and greater ability to share information and entertainment data/applications while in their vehicles. However vehicles are capable of storing a limited amount of this data/applications (e.g., due to computing memory allocations). In addition, if the vehicle or cellular phone is damaged or destroyed, the data may be lost. Also, occupants may desire to access data/applications which are stored on other devices (such as a personal home computer or the computer within another vehicle owned by the occupant).

Sometimes, it is also desirable for vehicles to store the same information as other similar vehicles—e.g., a vehicle manual. As a matter of computer-memory economy, it is a waste of resources for a multiplicity of electronic copies the same manual to be stored on each of a multiplicity of vehicles.

SUMMARY

According to an embodiment of the invention, there is provided a method of accessing a data member located in a cloud server from a vehicle. The method may include a providing step, a configuring step, and an accessing step. The providing step may include providing at least one client; e.g., a first client may be an e-glovebox device in a first vehicle. The configuring step may include configuring a cloud server to allow at least one client access thereto. And the accessing step may include accessing the cloud server using the e-glovebox device. This may include either uploading one or more data members to the cloud server (e.g., the one or more data members may be accessible to at least one client for download) or downloading one or more data members from the cloud server (e.g., one or more data members may have been uploaded by the first client or by a second client and e.g., one or more data members may be accessible to at least one client).

According to another embodiment of the invention, there is provided a method of cloud computing from a vehicle that includes: uploading a data member from a second client to a cloud server; storing the data member at the cloud server; and downloading the data member by a first client from the cloud server. In this embodiment, at least one of the clients is an e-glovebox device.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

The method described below pertains to cloud computing from a vehicle. The vehicle may contain an embedded or portable electronic glovebox device (e.g., e-glovebox device) which may allow a user in the vehicle to access a remote database (e.g., a cloud server or cloud server database). Using the e-glovebox device (a client), the user may upload, download, and store data files and applications, among other things. The user may also share access to the data files, applications, etc. stored thereon with another client. Thus, one or more clients may be granted access to upload, download, store, erase, change or modify information stored on the database.

Communications System—

Figure 1:
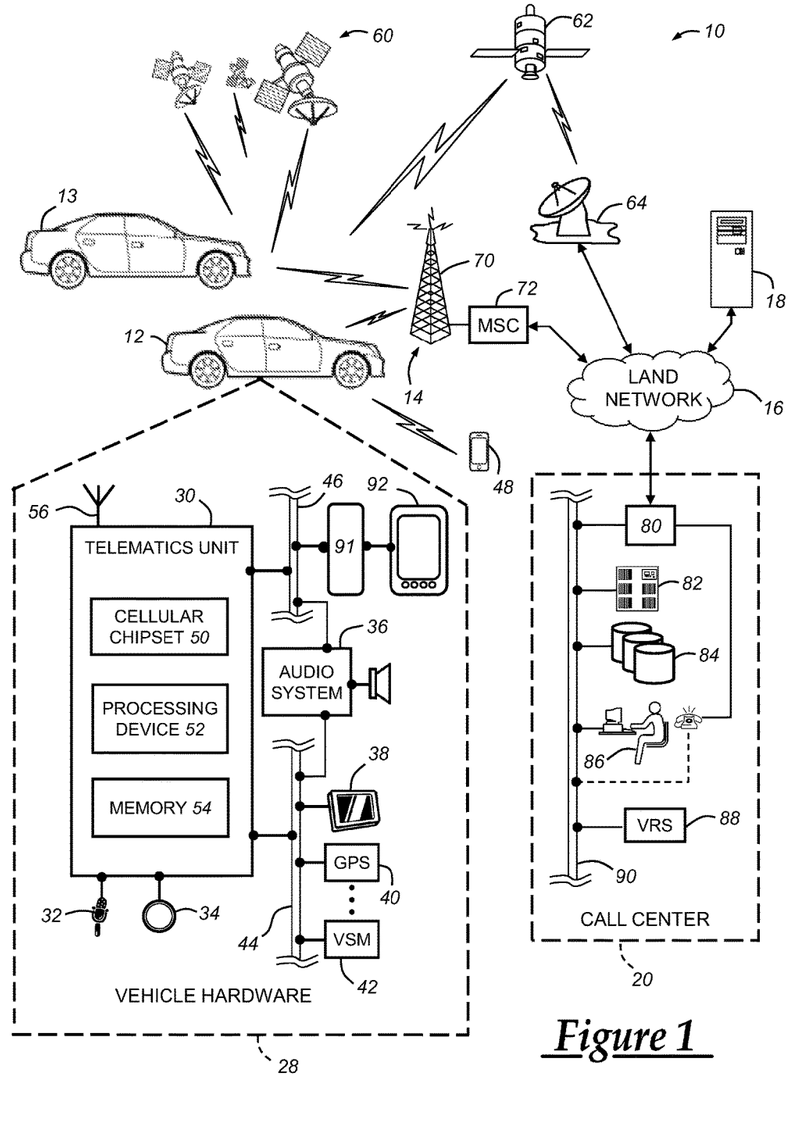
FIG. 1 is a block diagram depicting an embodiment of a communications system that is capable of utilizing the method disclosed herein.

With reference to FIG. 1, there is shown an operating environment that comprises a mobile vehicle communications system 10 and that can be used to implement the system and method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Vehicle 13 is depicted in the illustrated embodiment as another passenger car, and it may also be any other vehicle (as described with respect to vehicle 12). Vehicle 13 may be associated with vehicle 12 (e.g., it may be a vehicle owned or licensed for use to members of the same household, the same company, the same business, other association, etc.). The vehicle 13 may have some or all of the electronics illustrated with respect to vehicle 12 and may be also be associated with and/or in communication with mobile devices such as device 48 (this association/communication is not shown). Vehicle 13 is merely exemplary; i.e., there may be a multiplicity of vehicles similarly associated to vehicle 12 (e.g., vehicle $13_1, 13_2, \ldots, 13_N$).

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

In some implementations, the vehicle 12 may have therein an electronic glovebox or e-glovebox device 92. The e-glovebox device may be a device that enables users of the vehicle to store, access, and share electronic data using a cloud server and/or a cloud server device (e.g., on memory associated with a remote server such as computer 18) rather than memory in the vehicle (e.g., rather than or in addition to memory 54). In some implementations, the e-glovebox device 92 may be an embedded device or a portable device.

In at least one embedded device embodiment, the e-glovebox device 92 may utilize various components of the telematics unit 30 including the cellular chipset 50, processing device 52, and/or memory 54. In addition, the embedded device embodiment may utilize the display 38, the audio system 36, and various other suitable hardware and/or software including the buses 44, 46.

Figure 2:
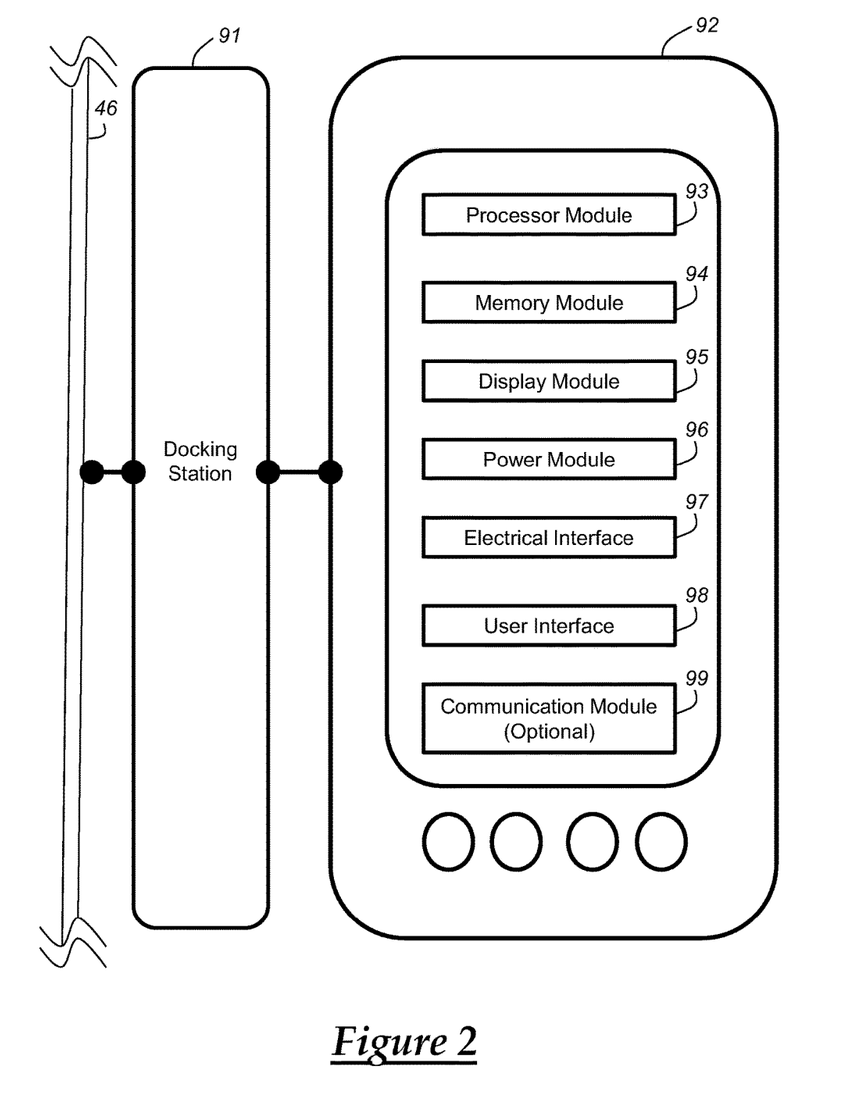
FIG. 2 is a block diagram depicting an embodiment of an electronic glovebox device.

In one portable device embodiment (see also FIG. 2), the e-glovebox device 92 may include a processor module 93, a memory module 94, a display module 95, a power module 96, electrical interface 97, and a user interface 98. The processor module 93, the memory module 94, the display module 95, and the user interface 98 may include all or some of the same functionalities found in the processor 52, memory 54, the display 38, and the vehicle electronics 28, respectively. These modules (e.g., 93, 94, 95, 96, 97, 98), the interconnections, arrangements, or coupling together thereof are known to skilled artisans. For example, the electrical interface 97 may include a means for coupling the device 92 to the vehicle 12 via a vehicle docking station 91. The vehicle docking station 91 may include mechanical and electrical interfaces; e.g., a means for physically carrying and/or supporting the e-glovebox, as well as a means for providing power to the device 92 and a means for sending/receiving communicative signals. In some embodiments, the portable device 92 may be a tablet-type computer and may in some instances have touch-screen capability. In addition, the portable device 92 may optionally include a communication module 99; the communication module 99 may enable the device to communicate over the wireless carrier system 14 and/or via short range wireless communication (e.g, with or without the aid of the telematics unit). In other embodiments where the communication module 99 is absent, the e-glovebox device 92 may utilize the telematics unit 30 to communicate with the cloud server 18.

Regardless of whether the e-glovebox device 92 is embedded within the vehicle or portable, the device 92 may be used to store, access, and share electronic data using memory located at the cloud server 18. Electronic data or data members stored may include a variety of data files or computers program instructions, for example, among other things, data files, data programs, software, and/or executable applications. In some instances, the applications may be operative from the server 18 rather than being required to be installed on an individual computer or within the vehicle 12—e.g., within the telematics unit 30. Skilled artisans will appreciate the multiplicity of ways to utilize server computing (e.g., but not limited to: database servers, file servers, mail servers, print servers, web servers, gaming servers, etc.).

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer (e.g., a personal computing (PC) device) used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

As previously discussed, the e-glovebox device 92 may access one or more computers 18 acting as cloud servers or cloud server devices having cloud memory located thereat. In some implementations, one or more cloud servers may be dedicated to vehicles utilizing the e-glovebox device. In addition, where the computer 18 is a cloud server device, the cloud server may be configured to allow access to remote clients according to various communication technologies and protocols known to skilled artisans. Access may include the capability of clients to upload and/or download data members.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

The operating environment may further include one or more handheld communications devices (HCDs) or mobile devices 48. The mobile device may be an electronic device which may be used to make mobile telephone calls across a wide geographic area where transmissions are facilitated by the wireless carrier system 14 (i.e., when the mobile device is connected to the wireless carrier system).

The mobile device may further include: hardware, software, and/or firmware enabling cellular telecommunications and communications via short-range wireless communication (e.g., Wi-Fi Direct and Bluetooth) as well as other mobile device applications. Such mobile device applications may include software applications, which may be preinstalled or installed by the user (or manufacturer) (e.g., having a graphical user interface or GUI). One commercial implementation of a vehicle-mobile device application may be RemoteLink™, enabling a vehicle user to communicate with the vehicle 12 and/or control various aspects or functions of the vehicle—e.g., among other things, allowing the user to remotely lock/unlock vehicle doors, turn the vehicle On/Off, check the vehicle tire pressures, fuel level, oil life, etc. RemoteLink™ may also allow the user to connect with the call center 20 or the call center advisor 86 at any time.

The hardware of the mobile device 48 may comprise: a display, a keypad (e.g., push button and/or touch screen), a microphone, one or more speakers, motion-detection sensors (such as accelerometers, gyroscopes, etc.), and a camera. In addition to the aforementioned features, modern mobile devices may support additional services and/or functionality such as short messaging service (SMS or texts), multimedia messaging service (MMS), email, internet access, as well as business and gaming applications. Non-limiting examples of the mobile device 48 include a cellular telephone, a personal digital assistant (PDA), a Smart Phone, a personal laptop computer having two-way communication capabilities, a netbook computer, or any suitable combinations thereof. The mobile device 48 may be used inside or outside of a mobile vehicle (such as the vehicle 12 shown in FIG. 1), and may be coupled to the vehicle by wire or wirelessly (e.g., using short range wireless communication). The mobile device also may be configured to provide services according to a subscription agreement with a third-party facility or wireless/telephone service provider. It should be appreciated that various service providers may utilize the wireless carrier system and that the service provider of the telematics unit 30 may not necessarily be the same as the service provider of the mobile devices 48.

The mobile device 48 and the vehicle 12 may be used together by a person known as the vehicle user such as the driver. However, the vehicle user does not need to be the driver of the vehicle 12 nor does the vehicle user need to have ownership of the mobile device 48 or the vehicle 12 (e.g., the vehicle user may be an owner or a licensee of either or both).

Method—

Now turning to the various methods to implement the described system and operating environment, as previously described, one or more clients may be granted access to the cloud server which has an electronic database. The clients may include: the electronic glovebox 92 or the telematics unit 30 (e.g., in the vehicle 12 or in the vehicle 13), the computer 18 (including a client computer or PC), the call center 20, the mobile device 48, or any other electronic device capable of accessing the cloud server database (e.g., another implementation of computer 18).

Figure 3:
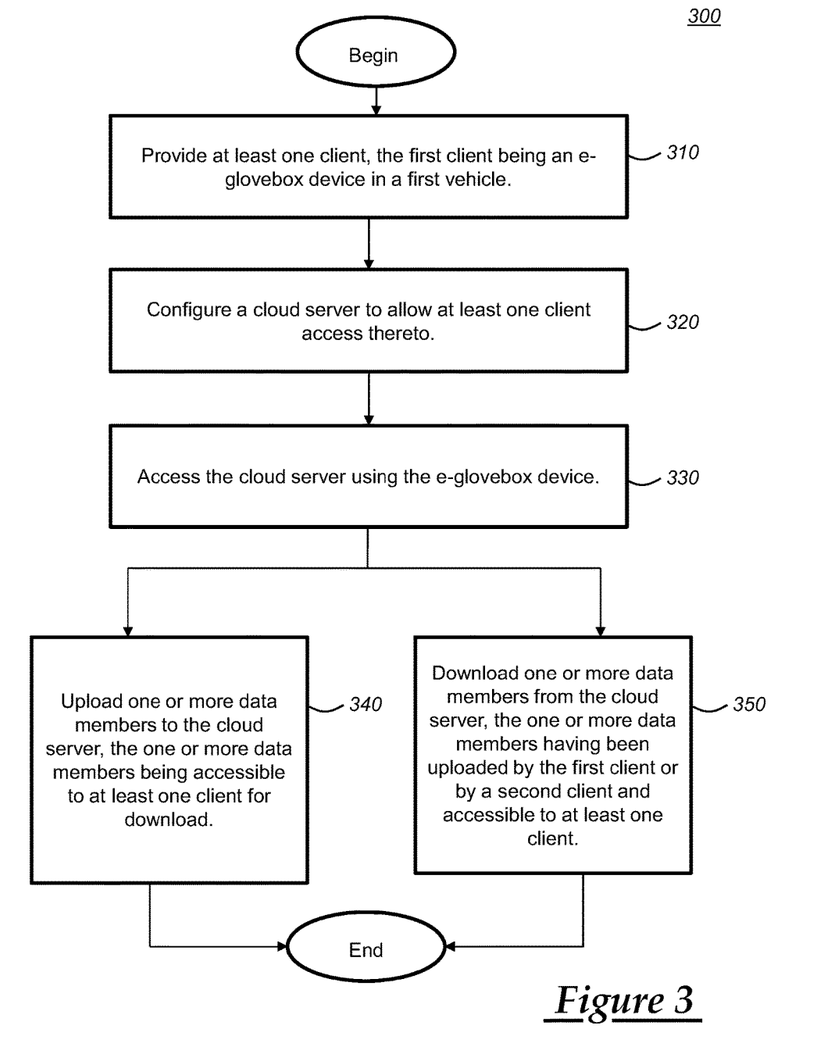
FIG. 3 is a flowchart depicting an embodiment of a method of accessing a data member located in a cloud server from a vehicle.

Turning now to FIG. 3, there is shown an exemplary method 300 of using the e-glovebox device 92. The method begins at step 310 where at least one client is provided; in this embodiment, at least one client is a first client which is the e-glovebox 92. At step 320, the cloud server 18 is configured to allow access to at least one client. In this instance, at a minimum the first client is permitted to access the cloud server. At step 330, the e-glovebox device 92 accesses the cloud server. After step 330, the method proceeds to either step 340 or step 350. At step 340, one or more data members may be uploaded to the cloud server from the e-glovebox device 92. The one or more data members may be accessible to the e-glovebox device (the first client), and in some instances, the data members may also be accessible to other clients (e.g., a second client). That is, once a data member is uploaded, it may later be downloaded by the same client and in some instances another client. At step 350, one or more data members may be downloaded from the cloud server by the e-glovebox device 92. The one or more data members available for download may have been previously uploaded by either the first client or by the second client. In addition, the one or more data members may be available for download to other clients, such as the second client. The method may end after the completion of step 340 or 350.

Figure 4:
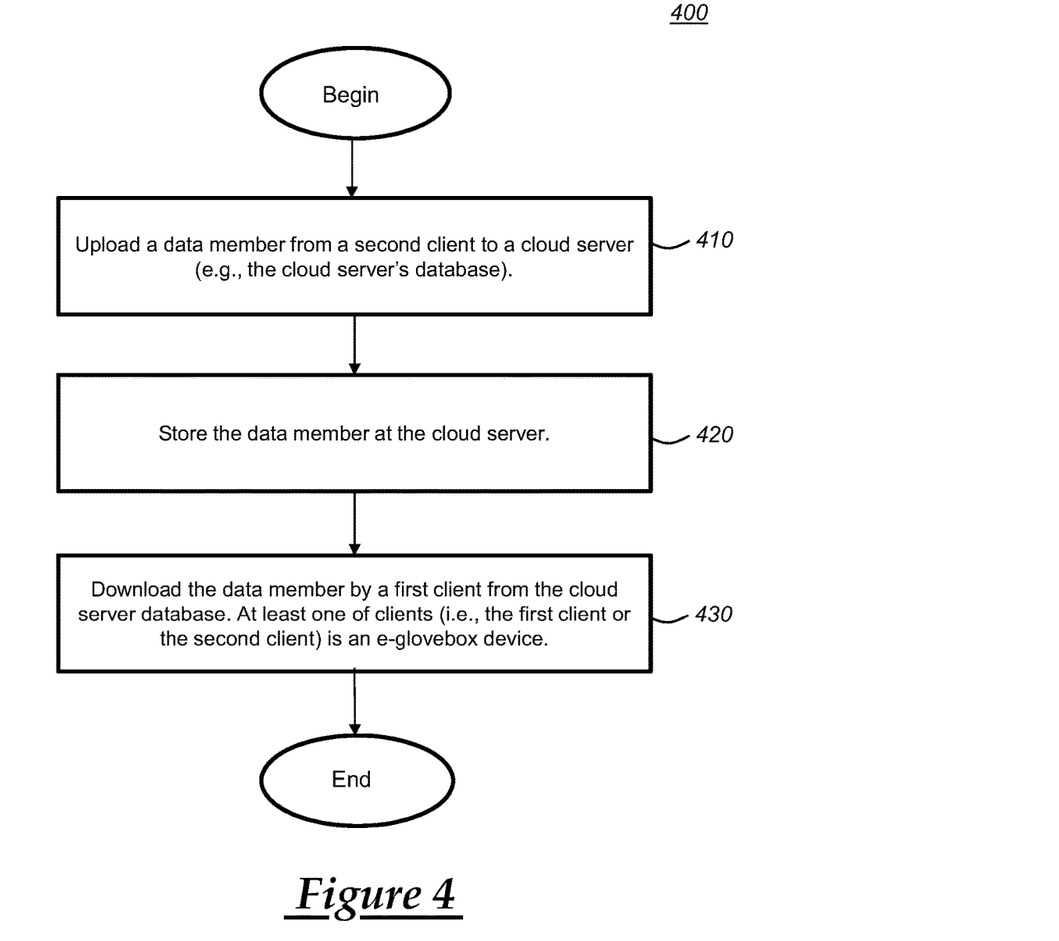
FIG. 4 is a flowchart depicting an embodiment of a method of cloud computing from a vehicle.

FIG. 4 illustrates another exemplary method 400 of using the e-glovebox device 92 between two clients (a first client and a second client). The method begins with step 410 where a data member is uploaded from the second client to a cloud server (or e.g., the cloud server's database). At step 420, the data member is stored at the cloud server (e.g., in the database). And at step 430, the data member is downloaded by the first client from the cloud server database. In this embodiment, at least one of the clients is a e-glovebox device. In some instances, the first client may also be the second client.

Therefore, in accordance with the implementations shown in FIGS. 3 and 4, the e-glovebox device 92 and/or another client may upload or download data members which include audio files (e.g., MP3 files or audio books), video files, image files, other media or communication or entertainment files (e.g., grocery lists, messages such as chat, email, text, etc.), software applications (e.g., audio, video, entertainment, utility, etc.), vehicle or driver information (e.g., insurance information (e.g., including electronic proofs), registration, driver's license (e.g., electronic copy)), technical manuals, maintenance information (e.g., changing tires, tire pressure, replacing wipers or interior/exterior vehicle lighting, checking fluid levels, changing filters (oil, air, etc.), maintenance updates), vehicle e-tools (e.g., an electronic flash light or backlighting), e-glovebox device updates (e.g., firmware/software fixes, patches, updates, etc. related to a wireless carrier provider or software applications used by or stored on the e-glovebox device, etc.), trip itineraries, map data or files, entertainment establishment information (e.g., such as menus, reservations, etc.), electronic advertisements, electronic coupons or discounts, electronic emergency information (emergency contact (e.g., on the log screen), first aid guide(s), other various emergency phone numbers, etc.), and any other electronic information that the vehicle users and/or occupants may wish to have local access. In instances where the data member(s) are advertisements, the advertisements may be in accordance with time and location information. For example, where the client (e.g., the vehicle 12, 13, the e-glovebox device 92, etc.) is traveling within a predetermined proximity of a restaurant within a predetermined range of time (including dates, lunchtime, dinnertime, etc.), the electronic advertisement may be provided for download by the client; in addition, a notification may be provided to the client (e.g., a push notification via the electronic glovebox 92).

It should be appreciated that portable implementations of the e-glovebox device 92 may enable a user to remove the e-glovebox device from the vehicle and present information displayed thereon to others. For example, a vehicle user may remove the device 92 from the vehicle and present an electronic coupon to a merchant for redemption without having to print the coupon. In some instances, the display may permit a barcode associated with the coupon to be scanned directly from the display. Or for example, the user may present his/her e-driver's license or e-registration to a police officer by separating the e-glovebox from the vehicle docking station 91.

The e-glovebox device 92 or the second client may initiate the uploading or downloading. In some implementations, a remote computer 18 or the call center 20 may upload data members for the e-glovebox device 92 to download. In other implementations, the e-glovebox device in vehicle 12 may upload data members for another the e-glovebox device (e.g., in vehicle 13) to download (or vice versa). In another implementation, the mobile device 48 may upload/download data members for the e-glovebox device to upload/download. In another implementation, the e-glovebox device in vehicle 12, 13 may upload data members and store them on the cloud server and then later download the same data member(s).

In yet another implementation, the first client may upload the data member(s) to the cloud server 18, the second client may download the data member, the second client may alter or modify at least one characteristic of the data member, and the second client may then re-upload the altered data member to cloud server 18. Prior to altering the data member, the second client in some instances may archive or save a copy of the original data member. This may be helpful if it later becomes necessary to retrieve the unaltered or original version of the data member. In addition, the cloud server 18 may also save a copy of the original data member(s) as well. It is also possible for any client having access to the cloud server to erase or delete one or more data members that have been stored on or uploaded to the cloud server. And similarly, these deleted data members may be archived by one or more clients (or the server itself) for later retrieval.

There may also be instances where the first and second clients attempt to download the same data member(s) simultaneously or synchronously; the cloud server may be configured to allow multiple clients simultaneous access.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of cloud computing from a vehicle, comprising the steps of:
   establishing a first cellular link between a telematics unit in the vehicle and a cloud server associated with a vehicle call center, wherein the telematics unit has a cellular chipset;
   receiving via the first cellular link at least one first data member at the telematics unit from the cloud server, wherein the at least one first data member is stored at the cloud server in a user account associated with a vehicle user, wherein the at least one first data member comprises an electronic representation of a vehicle registration, an electronic representation of a vehicle insurance proof, or both;
   providing the at least one first data member received via the cellular link from the telematics unit to an electronic glovebox (e-glovebox) device wherein the at least one first data member is provided via a wired vehicle connection or a short-range wireless vehicle connection, wherein the e-glovebox device receives the at least one first data member directly from the telematics unit without using a cellular chipset, and wherein the e-glovebox device is stowable within a cabin of the vehicle at a vehicle docking station; and
   displaying data to the vehicle user at a display of the e-glovebox device, the data being associated with the at least one first data member.

2. A method of cloud computing from a vehicle, comprising the steps of:
   (a) establishing a first cellular link between a telematics unit in the vehicle and a cloud server associated with a vehicle call center, wherein the telematics unit has a cellular chipset;
   (b) receiving via the first cellular link at least one first data member at the telematics unit from the cloud server, wherein the at least one first data member is stored at the cloud server in a user account associated with a vehicle user, wherein the at least one first data member comprises an electronic representation of a vehicle registration, an electronic representation of a vehicle insurance proof, or both;
   (c) providing the at least one first data member received via the cellular link from the telematics unit to an electronic glovebox (e-glovebox) device wherein the at least one first data member is provided via a wired vehicle connection or a short-range wireless vehicle connection, wherein the e-glovebox device receives the at least one first data member directly from the telematics unit without using a cellular chipset, and wherein the e-glovebox device is stowable within a cabin of the vehicle at a vehicle docking station;
   (d) receiving a user input from the vehicle user at an interface of the e-glovebox device; and
   (e) displaying data to the vehicle user at a display of the e-glovebox device, the data being associated with the at least one first data member.

3. The method of claim 2, wherein steps (a), (b), (c), and (e) occur in response to receiving the user input.

4. The method of claim 3, wherein the at least one first data member is stored in memory of the e-glovebox device for displaying the data to the vehicle user at a later time without re-establishing the first cellular link.

5. The method of claim 2, wherein the at least one first data member comprises a plurality of first data members that includes an electronic representation of an advertisement directed to the vehicle user for discounting goods, services, or both.

6. The method of claim 2, wherein the at least one first data member comprises a plurality of first data members that includes at least one of: a technical manual application associated with the vehicle; application software associated with maintenance information for the vehicle; application software associated with the vehicle, a manufacturer, or a dealership; application software associated with receiving maintenance updates for the vehicle; application software associated with emergency information; or application software associated with entertainment and infotainment media.

7. The method of claim 2, wherein both the telematics unit and the e-glovebox device are original equipment provided by a vehicle manufacturer.

8. The method of claim 2, wherein, prior to the receiving step, the at least one first data member was provided to the cloud server by the vehicle user or an authorized user of the user account, wherein the authorized user is associated with the vehicle call center.

9. The method of claim 2, further comprising:
   storing at least one second data member at the e-glovebox device;
   providing the at least one second data member from the e-glovebox device to the telematics unit via the wired vehicle connection or the short-range wireless vehicle connection;
   establishing a second cellular link between the telematics unit and the cloud server; and
   transmitting via the second cellular link the at least one second data member from the telematics unit to the cloud server for storage at the cloud server in the user's account.

10. The method of claim 9, wherein the first cellular link and the second cellular link are the same cellular link.

11. The method of claim 9, wherein the at least one second data member overwrites the at least one first data member at the cloud server.

12. The method of claim 11, wherein the at least one second data member is accessible from the cloud server by the vehicle user or another authorized user via a web portal at a personal computer, via a first mobile device associated with the vehicle user, or via another telematics unit in another vehicle.

13. The method of claim 2, wherein additional data members may be uploaded to the user account at the cloud server via a web portal at a personal computer, via a first mobile device associated with the vehicle user, via a second mobile device by an authorized user associated with the user account, or via a second telematics unit in a second vehicle, wherein the second vehicle is associated with the vehicle user, wherein after the additional data members thereafter are available for download to the e-glovebox device by:
  establishing a second cellular link between the telematics unit in and the cloud server;
  receiving at the telematics unit via the second cellular link at least one of the additional data members stored at the cloud server; and
  providing the at least one of the additional data members received via the second cellular link from the telematics unit to the e-glovebox device via the wired vehicle connection or the short-range wireless vehicle connection.

* * * * *